US011346494B2

(12) United States Patent
Berkes

(10) Patent No.: US 11,346,494 B2
(45) Date of Patent: May 31, 2022

(54) CUSTOMIZABLE IN-GROUND STAND FOR ELEVATED OBJECT RETENTION

(71) Applicant: Iron Garden Products LLC, Medina, OH (US)

(72) Inventor: Ronald J. Berkes, Pasadena, CA (US)

(73) Assignee: Iron Garden Products LLC, Medina, OH (US)

( * ) Notice: Subject to any disclaimer, the term of this patent is extended or adjusted under 35 U.S.C. 154(b) by 68 days.

(21) Appl. No.: 17/004,948

(22) Filed: Aug. 27, 2020

(65) Prior Publication Data

US 2021/0131606 A1    May 6, 2021

Related U.S. Application Data

(60) Provisional application No. 62/928,200, filed on Oct. 30, 2019.

(51) Int. Cl.
*F16M 11/04* (2006.01)
*B65B 67/12* (2006.01)
*A45F 3/44* (2006.01)

(52) U.S. Cl.
CPC .............. *F16M 11/041* (2013.01); *A45F 3/44* (2013.01); *B65B 67/12* (2013.01); *F16M 2200/066* (2013.01); *F16M 2200/08* (2013.01)

(58) Field of Classification Search
CPC ........... F16M 11/041; F16M 2200/066; F16M 2200/08; B65B 67/12; A45F 3/44
USPC .................... 248/530, 545, 80, 156
See application file for complete search history.

(56) References Cited

U.S. PATENT DOCUMENTS

| 4,319,726 | A | * | 3/1982 | Andersson | B65B 67/12 171/43 |
| 4,497,077 | A | * | 2/1985 | Provost | A47K 1/02 248/156 |
| 5,570,863 | A | * | 11/1996 | Cooper | A45F 3/44 248/146 |
| 6,195,926 | B1 | * | 3/2001 | Jarl | G09F 3/08 248/87 |

(Continued)

FOREIGN PATENT DOCUMENTS

| GB | 2214890 A | * | 9/1989 | ......... B65B 67/1205 |
| GB | 2331230 A | * | 5/1999 | ......... A47G 23/0225 |

(Continued)

*Primary Examiner* — Tan Le
(74) *Attorney, Agent, or Firm* — Ansari Katiraei LLP; Arman Katiraei; Sadiq Ansari

(57) ABSTRACT

Disclosed is a customizable in-ground stand that retains its position in response to off-center, leaning, and/or top-heavy forces imposed onto it by a retained object. The stand includes an elongated tube. The stand includes an interchangeable retention ring with a downward extension that attaches to a top of the elongated tube, and with a length of tube that extends laterally in front of the elongated tube as an incomplete ring from the downward extension. The stand further includes an interchangeable base with a rod that attaches to a bottom of the elongated tube, and with support members that extend outwards from each side of the rod. Each of the support members has a vertical triangular plate that extends perpendicularly from the rod and that narrows to a particular point towards a bottom of the rod, and a lip that extends perpendicularly over each vertical triangular plate.

15 Claims, 11 Drawing Sheets

(56) References Cited

U.S. PATENT DOCUMENTS 6,575,417 B1 * 6/2003 Krommenakker .......................... A47G 23/0225
248/151

FOREIGN PATENT DOCUMENTS

| GB | 2354155 A | * | 3/2001 | ............... | A45F 3/44 |
| GB | 2406498 A | * | 4/2005 | ............... | A45F 3/44 |

* cited by examiner

CUSTOMIZABLE IN-GROUND STAND FOR ELEVATED OBJECT RETENTION

CLAIM OF BENEFIT TO RELATED APPLICATIONS

This application claims the benefit of U.S. provisional application 62/928,200, entitled "Removable Garden Pot Stand", filed Oct. 30, 2019. The contents of application 62/928,200 are hereby incorporated by reference.

BACKGROUND

Potted plants may be elevated off the ground for decorative or ease-of-access reasons. Potted plants may be suspended from an awning or ceiling via a chain, cabling, or rope, or may be elevated using a stand. Potted plants can weigh several pounds, and can make the stands top-heavy by virtue of their attachment towards a top of the stand. Accordingly, there is a need for flower pot stands that provide rigidity and stability. However, users also require that the shape and form of the flower pot stand does not detract from the overall landscape aesthetic, and that, in some cases, the flower pot stand enhance the overall landscaping aesthetic.

DETAILED DESCRIPTION OF PREFERRED EMBODIMENTS

The following detailed description refers to the accompanying drawings. The same reference numbers in different drawings may identify the same or similar elements.

Disclosed is a customizable in-ground stand for elevated object retention. In particular, the stand may be inserted into the ground, and may be used to suspend or retain a pot or other object off the ground without lateral displacement of the stand. The stand may provide a rigid and stable structure that retains its position in response to off-center, leaning, and/or top-heavy forces imposed onto it by the retained pot or other object.

The stand may include a base with one or more spades, prongs, and/or other support elements. The support elements may be specifically orientated and/or positioned with respect to the base to retain a vertical position of the stand even when the suspended object at the top end causes the stand to become front-heavy and/or top-heavy. The stand further includes a pole and/or rod that extends upward from the base, and a retention ring at the top of the pole. The retention ring may have different diameters and/or shapes to match the diameters and/or shapes of different objects that can be inserted into and held in place by the retention ring. For instance, the base of a truncated cone or conical pot may be inserted through the retention ring until the wider top portion of the pot contacts the retention ring and is suspended over the ground by the retention ring.

In some embodiments, the retention ring suspends an object entirely about a front side of the stand. The set of spades, prongs, or other support elements at the base may be positioned to retain the vertical position of the stand despite the off-center weighting and/or front-heavy weighting of the stand when retaining the object about the front side.

In some embodiments, the base, pole, and retention ring may be detachable elements that connect to one another. In some embodiments, the stand may support additional attachments along the pole to customize the stand.

Figure 1:
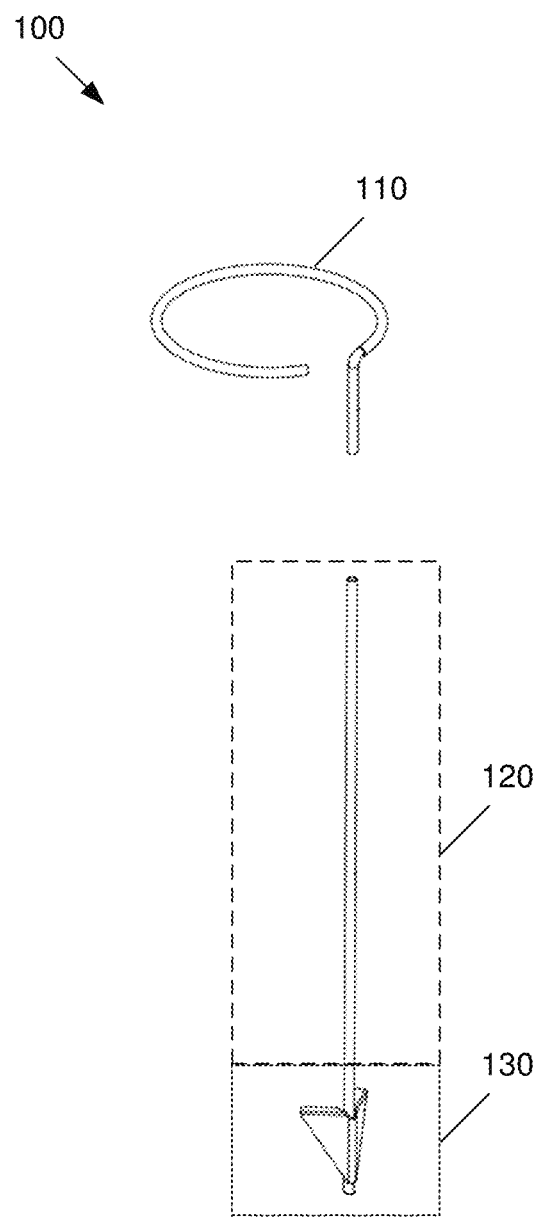
FIG. 1 illustrates an example of a customizable in-ground stand for elevated object retention in accordance with some embodiments presented herein.

FIG. 1 illustrates an example of stand 100 in accordance with some embodiments presented herein. As shown in FIG. 1, stand 100 may include retention ring 110, vertical support 120, and base 130. Each of retention ring 110, vertical support 120, and base 130 may detached and reattached to form stand 100. In this figure, retention ring 110 is detached from vertical support 120, and vertical support 120 is connected to base 130.

Base 130 may include a set of spades. Retention ring 110, vertical support 120, and/or base 130 may be made of a metal, rigid plastic, and/or another material that can support the weight of a potted plant or other heavy object (e.g., an object weighing several pounds) without bending or deforming.

Figure 2A:
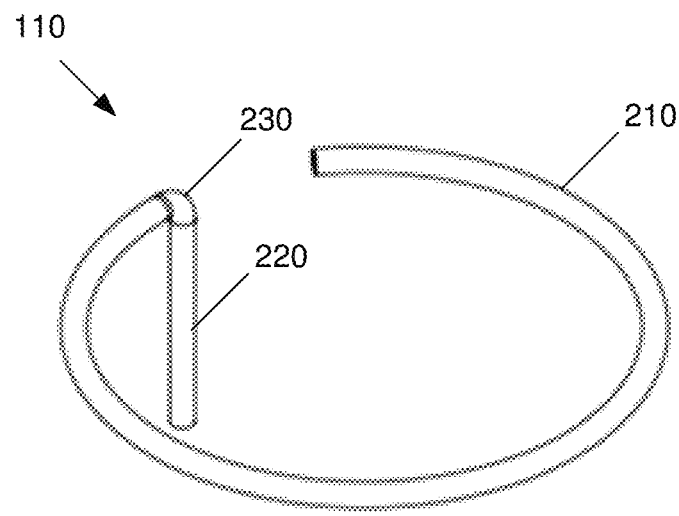
FIG. 2A illustrates a top perspective view of a retention ring for the stand in accordance with some embodiments presented herein.
Figure 2B:
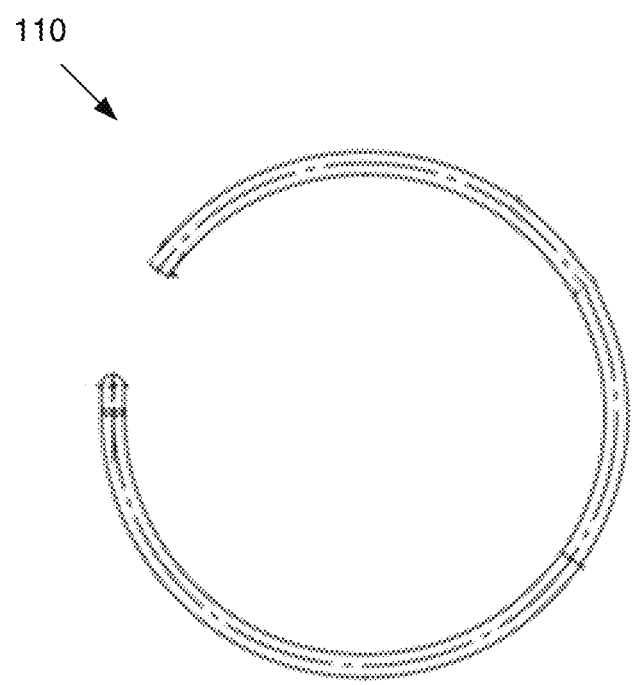
FIG. 2B illustrates a top view of the retention ring in accordance with some embodiments presented herein.
Figure 2C:
FIG. 2C illustrates a side view of the retention ring in accordance with some embodiments presented herein.
Figure 2D:
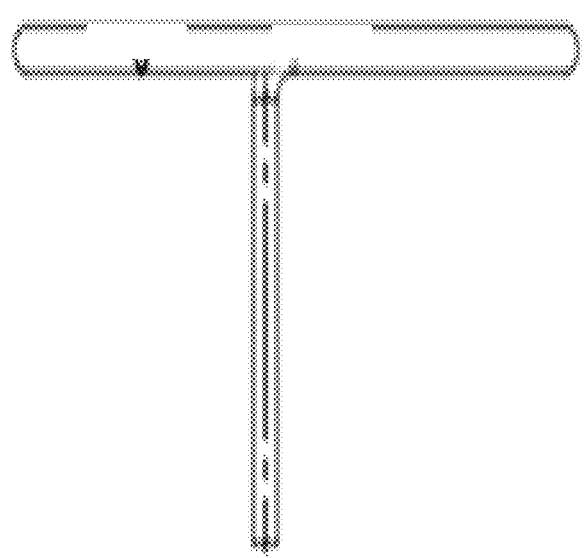
FIG. 2D illustrates a front view of the retention ring in accordance with some embodiments presented herein.

FIGS. 2A, 2B, 2C, and 2D provide different views of retention ring 110 in accordance with some embodiments presented herein. In particular, FIG. 2A illustrates a top perspective view of retention ring 110, FIG. 2B illustrates a top view of retention ring 110, FIG. 2C illustrates a side view of retention ring 110, and FIG. 2D illustrates a front view of retention ring 110 in accordance with some embodiments presented herein.

Retention ring 110 may include a horizontal or lateral extension and a downward extension. The horizontal extension may be circular in shape and may form an incomplete ring that is used to retain pots and/or other objects with a truncated cone or conical shape. In some embodiments, the horizontal extension includes a gap that allows retention ring 110 to expand slightly in order to accommodate objects of different diameters and/or circumferences. In some embodiments, the horizontal extension may have other shapes to retain objects of different shapes. For instance, retention ring 110 may have a square or hexagonal shape to retain cubic or hexagonal objects.

The downward extension may be used to couple retention ring 110 into or over the top end of vertical support 120. In some embodiments, the downward facing end of downward extension may include threading for screwing retention ring onto complimentary threading at a top end of vertical support 120. In some other embodiments, the downward facing end of downward extension may be sized smaller or larger than the top of vertical support 120 to allow for retention ring 110 to be inserted into or over a top portion of vertical support 120.

The horizontal extension and downward extension may comprise a single piece of metal, or, more specifically, a single extension of a hollow or solid rounded tube that is formed by bending or molding. In particular, the rounded tube may be bent into the circular shape of the horizontal extension from a first end, and may be bent downwards to form the downward extension at a second end.

Alternatively, in some embodiments, horizontal extension and downward extension may be separate pieces that are joined together via a coupling joint or elbow. Decoupling the horizontal extension from the downward extension may be preferable for reasons related to shipping and packaging as doing so may reduce the overall width of the product when shipped and/or packaged. For instance, in FIG. 2A, horizontal extension may comprise a first length of tube 210 formed as a partial circle or ring, and downward extension may comprise a separate and straight second length of tube 220. Coupling joint 230 may couple first length of tube 210 to second length of tube 220 via a 45-degree elbow connector. In some embodiments, coupling joint 230 may include inner threading that screws onto outer threading about an end of each first length of tube 210 and second length of tube 220. In some other embodiments, coupling joint 230 may include a female coupler that connects to male couplers at the ends of each first length of tube 210 and second length of tube 220. For instance, the ends of first length of tube 210 and second length of tube 220 may include a spring-loaded or push-button connector, and coupling joint 230 may include a diameter that is greater than the diameter at each end of first length of tube 210 and second length of tube 220, and side-facing openings into which the spring-loaded or push-button connectors connect to and protrude through in order to couple the components together.

Figure 2E:
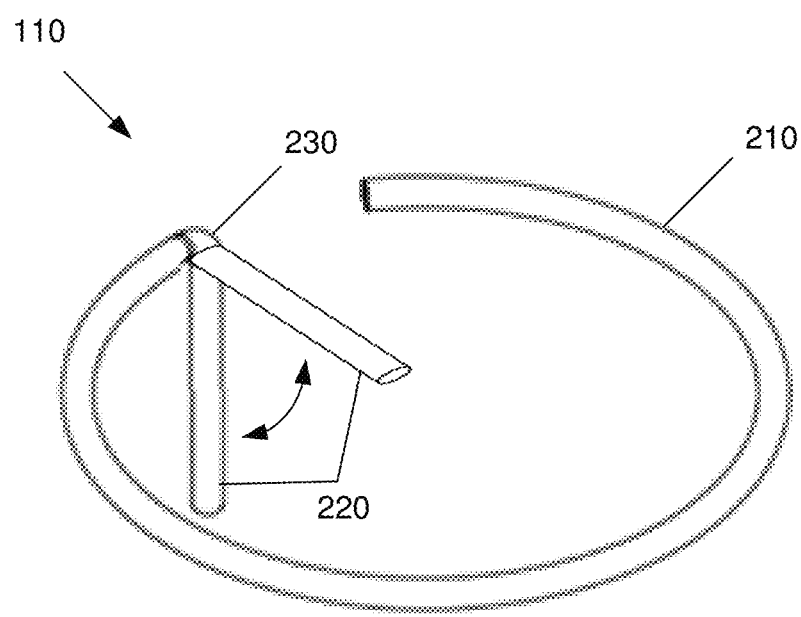
FIG. 2E illustrates an example of a coupling joint providing 90-degrees of rotation about an end of a first length of tube in order to dispose a second length of tube parallel or perpendicular to the first length of tube.

In some embodiments, coupling joint 230 may be a rotatable member of first length of tube 210. For instance, coupling joint 230 may be joined to first length of tube 210 via a rotating hinge, or may include a segment that turns within or about the outside end of first length of tube 210. FIG. 2E illustrates an example of coupling joint 230 providing 90-degrees of rotation about an end of first length of tube 210 in order to dispose second length of tube 220 parallel or perpendicular to first length of tube 210. When second length of tube 220 is rotated parallel to first length of tube 210, retention ring 110 may be shipped in smaller packaging that is equal to the width of the tubing or metal for retention ring 110. Coupling joint 230 may then be rotated downwards and perpendicular to first length of tube 210 in order to attach the horizontal extension or first length of tube 210 to second length of tube 220 or directly to vertical support 120. In some such embodiments, downward extension or second length of tube 220 may be directly connected to or extend from rotating coupling joint 230, and may therefore rotate with coupling joint 230 to be parallel with first length of tube 210 or to be perpendicular to first length of tube 210.

Retention ring 110 may be 0.5 to 3 inches thick. The ring formed by horizontal extension may extend between 270 and 350 degrees. Different embodiments of the horizontal extension may have a diameter between 8 and 36 inches in order to support pots of different sizes. For instance, retention ring 110 may include the horizontal extension with a 12-inch diameter in order to retain any truncated cone-shaped pot or object in which the bottom diameter of the truncated cone-shaped pot or object is less than 12 inches in diameter and the top diameter is greater than 12 inches in diameter. Downward extension may have a length between 0.5 inches and 3 inches.

Vertical support 120 may include a solid or hollow elongated rod or tube that extends between 1 and 5 feet, and attaches to retention ring 110 and base 130 to form stand 100. Vertical support 120 may have a cylindrical, square, flat, or other shape.

In some embodiments, vertical support 120 may include openings at the top and bottom ends for coupling to retention ring 110 and base 130. For instance, the downward extension of retention ring 110 may have a diameter that is smaller than the diameter for the opening at the top end of vertical support 120, allowing the downward extension to be inserted into the top end of vertical support 120.

Alternatively, vertical support 120 may be solid at either end with a diameter that is smaller than diameters for the downward extension of retention ring and for the top end of base 130. In some such embodiments, vertical support may be inserted into openings about the bottom end of retention ring 110 and about a top end of base 130.

In some embodiments, the ends of vertical support 120 may include threading (e.g., inner or outer threading) that screws onto complimentary or opposite threading about the bottom end of the downward extension or coupling joint 230 of retention ring 110, and that screws onto complimentary or opposite threading about the top end of base 130. Other embodiments may use different male and female coupling mechanisms (e.g., push-button couplers, sliding edge or tongue and groove couplers, etc.) to attach retention ring 110 to a top end of vertical support 120, and to attach base 130 to a bottom end of vertical support 120.

In some embodiments, vertical support 120 may extend vertically and may include a 45-degree bent top end. In some such embodiments, retention ring 110 may include first length of tube 210 for the horizontal extension, and may exclude second length of tube 220 for the downward extension and/or coupling joint 230. First length of tube 210 of retention ring 110 may attach directly to the 45-degree bent top end of vertical support 120.

In some embodiments, a spring-loaded connector may be used to connect retention ring 110, vertical support 120, and base 130 together. For instance, a spring-loaded or elastic cable may be attached at one end within retention ring 110, may run through hollowed-tubing of vertical support 120, and be attached at an opposite end within base 130. The cable may stretch to allow for separation of retention ring 110, vertical support 120, and base 130. However, when retention ring 110 is attached to vertical support 120 and vertical support 120 is attached to base 130, the cable may become taut to hold the structures together.

Figure 3A:
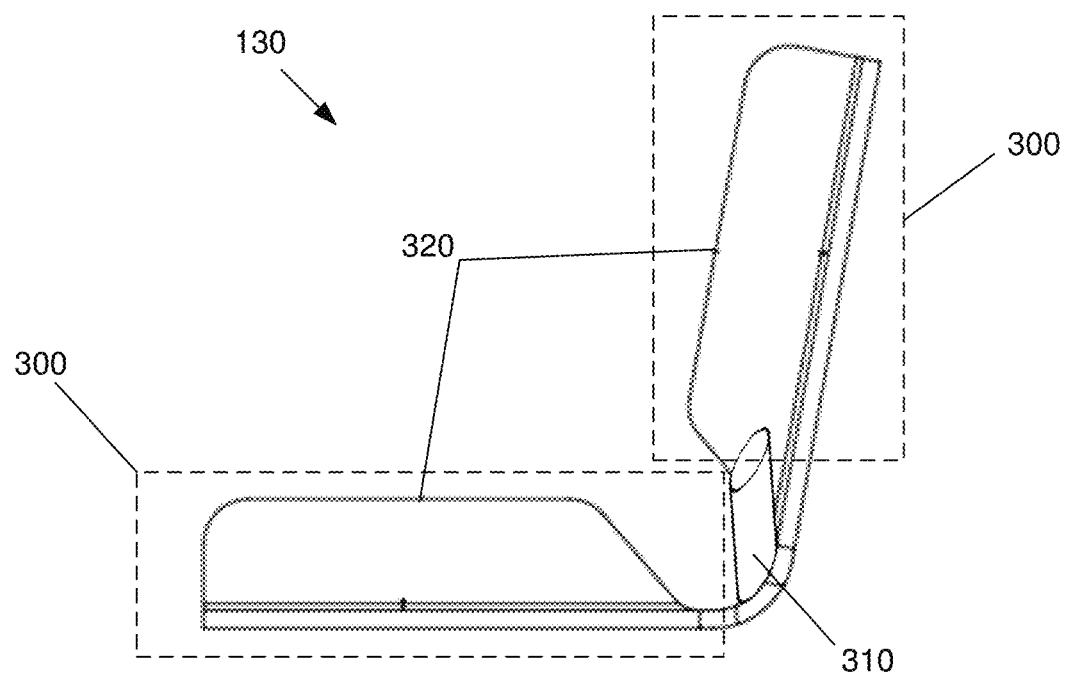
FIG. 3A illustrates a top view of a base for the stand in accordance with some embodiments presented herein.
Figure 3B:
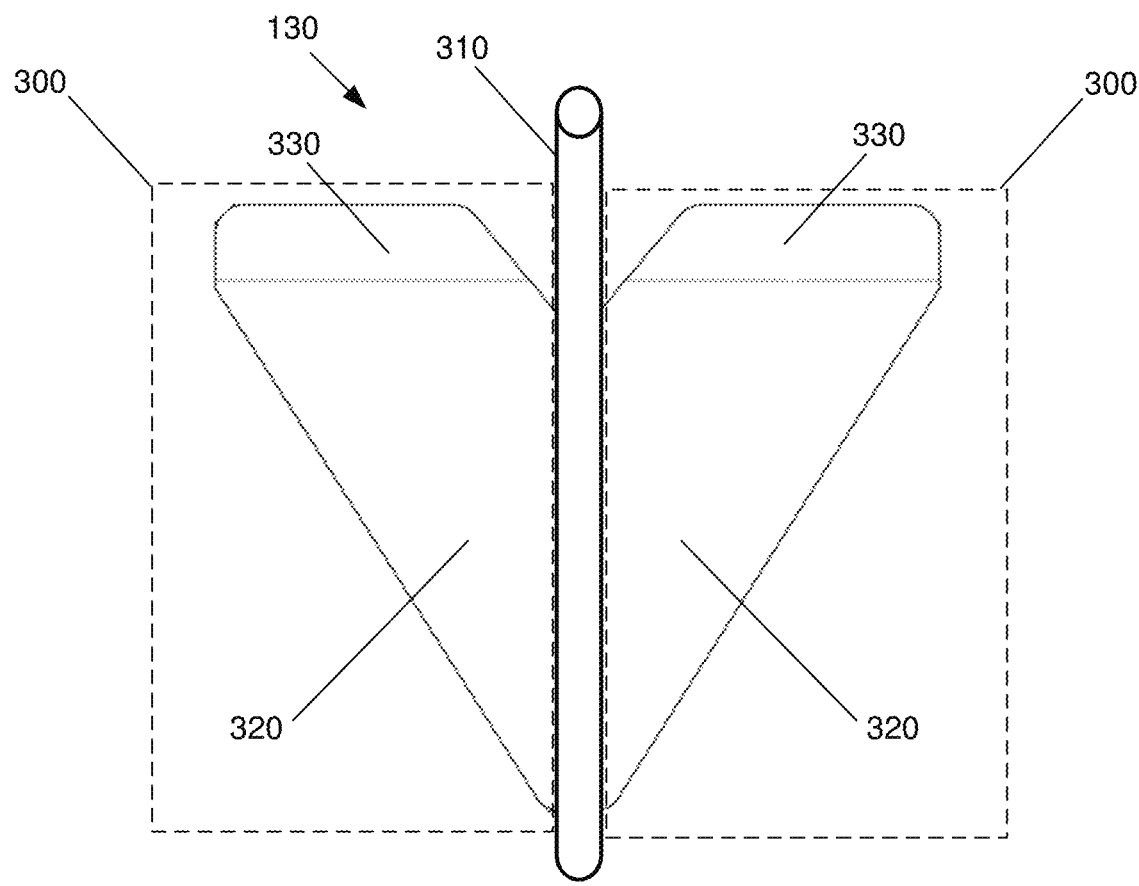
FIG. 3B illustrates an angled back view of the base in accordance with some embodiments presented herein.
Figure 3C:
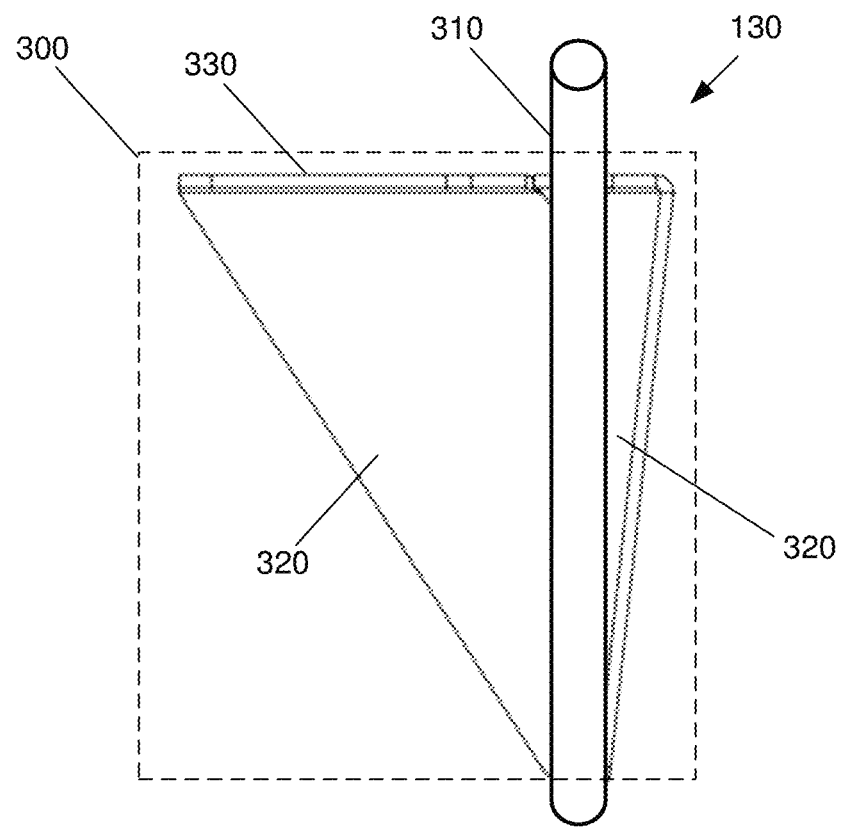
FIG. 3C illustrates a side view of the base in accordance with some embodiments presented herein.

FIGS. 3A, 3B, and 3C provide different views for base 130 in accordance with some embodiments presented herein. In particular, FIG. 3A illustrates a top view of base 130, FIG. 3B illustrates an angled back view of base 130, and FIG. 3C illustrates a side view of base 130 in accordance with some embodiments presented herein.

Base 130 may include central pole or rod 310 that is configured to attach to vertical support 120 via screw threading, insertion, or other forms of coupling. Rod 310 may be the same solid or hollow tube as vertical support 120, or may have a different diameter at the top end to support the coupling of base 130 to a bottom of vertical support 120.

Attached to rod 310 are support elements 320. Support elements 320 may be driven into the ground or soil, and may prevent displacement of stand 100 once in the ground.

Support elements 320 may include a pair of spades. Specifically, support elements 320 may include triangular plates or wedges that extend perpendicularly from rod 310 and outwards from either side of rod 310, and that narrow downward to a particular point (e.g., extend downwards with a decreasing width). The particular point at the bottommost end of the triangular wedges may provide a blade or sharp edge for easier penetration through the ground. In some embodiments, support elements 320 may include flat rectangular plates that extend from either side of rod 310. Support elements 320 may be made from solid pieces of metal, plastic, or another rigid material.

Support elements 320 may be angled or offset relative to one another in order to more securely retain the position of stand 100 in the ground when a heavy object is inserted into retention ring 110. Support elements 320 may extend at an acute angle towards a front side of stand 100, in the same direction as the horizontal extension of retention ring 110, and may have between 30 and 270 degrees of separation between them. Accordingly, in some embodiments, support elements 320 may be parallel to one another (e.g., angled 180 degrees relative to each other) or extend away from the front side of stand 100 in the opposite direction as the horizontal extension (e.g., angled at more than 180 degrees relative to each other).

In any configuration, support elements 320 retain a vertical position of stand 100 by providing an anchor that increases the surface area and ground contact when stand 100 is inserted into the ground. The increased ground contact increases the amount of force that is required to laterally displace stand 100, and the angled placement of support elements 320 further restrict lateral displacement of stand 100 (e.g., side-to-side, front-to-back, etc.).

As further shown in FIGS. 3A, 3B, and 3C, support elements 320 may include top lips 330 that extend perpendicularly over a top of support element 320. In some embodiments, a top portion of the metal or another material forming support element 320 is bent 90-degrees to form lips 330.

Lips 330 may provide foot pedals, platforms, or other surfaces against which the user may stomp or press down on with their foot in order to insert base 130 and support elements 320 into the ground. In particular, lips 330 increase the surface area that makes contact with the user's foot to prevent injury and/or to increase the amount of force that is transferred from the user's foot.

Additionally, lips 330 may improve the stability of stand 100 when inserted into the ground. Specifically, once the entire length of support elements 320 are inserted into the ground, lips 330 become parallel to and rest directly atop the ground. Lips 330 then prevent lateral displacement of stand 100 (e.g., tilting in the direction of lips 330) as a result of the lateral contact with the ground.

In some embodiments, each lip 330 may have a width between 1 and 6 inches, and may have a length between 1 and 6 inches. Each support element 320 may have a width equal to a width of a corresponding lip 330, and may have a length between 3 and 8 inches.

Figure 3D:
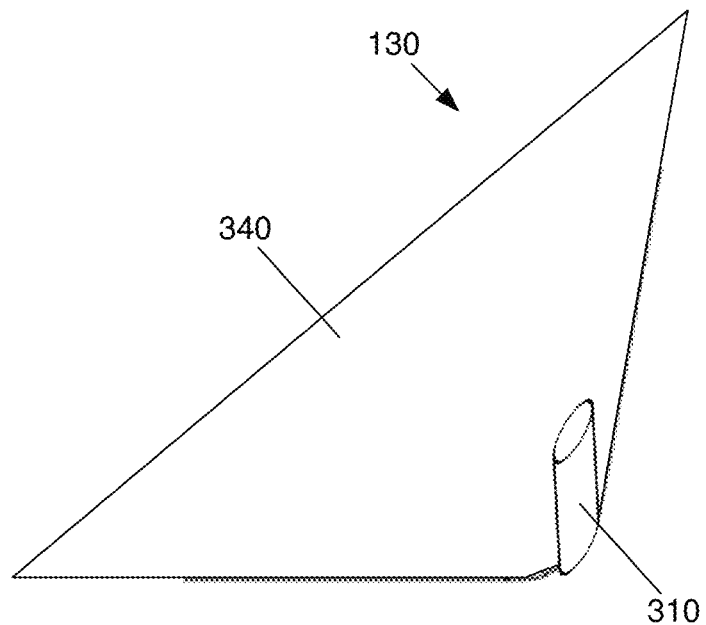
FIG. 3D illustrates a top view of the base with a single lip or platform extending over the support elements in accordance with some embodiments presented herein.

In some embodiments, the lips 330 may be connected by a single piece of metal to provide a larger platform or surface against which with the user may stomp to insert stand 100 into the ground, and to retain the position of stand 100 (e.g., prevent leaning or tilting) once stand 100 is inserted into the group. FIG. 3D illustrates a top view of base 130 with single lip or platform 340 extending over support elements 320 in accordance with some embodiments presented herein.

Support elements 320 may be welded to rod 310 to provide base 130 as a single piece. However, separately attaching support elements 320 to rod 310 may be preferable for reasons related to shipping and packaging as doing so may reduce the overall width of the product when shipped and/or packaged. For instance, support elements 320 may include two separate plates that each have at least one hole below lip 330 along an inner section of the plate that abuts rod 310. The holes may be aligned with one in the back of rod 310 or holes on either side of rode 310. One or more screws, nuts and bolts, or other fasteners may then be used to secure each support element 320 to rod 310.

Retention ring 110, vertical support 120, and base 130 may be detached to allow for various customizations of stand 100 using interchangeable components. For instance, retention ring 110 may be replaced with a retention ring that has a larger or smaller diameter, may be replaced with a square or rectangular formed retention element that is better suited for holding square or rectangular flower pots and other object, or may be replaced with different top elements that provide utility other than retaining a flower pot.

Figure 4:
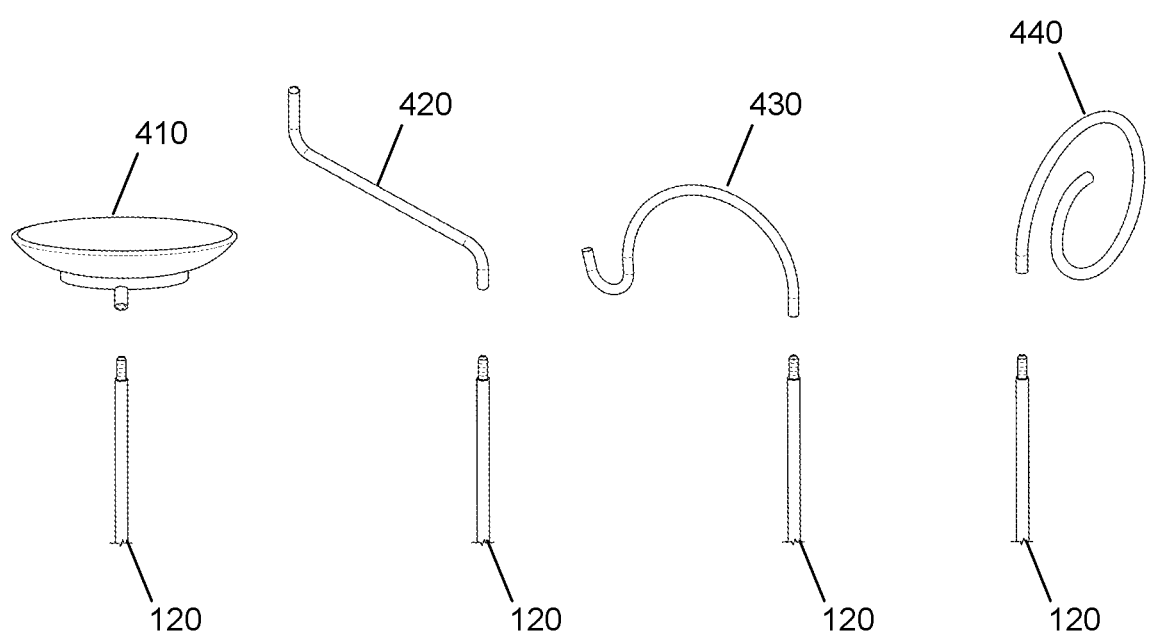
FIG. 4 illustrates four different top interchangeable elements for customizing the top section of the stand in accordance with some embodiments presented herein.

FIG. 4 illustrates four different top interchangeable elements 410, 420, 430, and 440 for customizing the top section of stand 100 in accordance with some embodiments presented herein. Elements 410, 420, 430, and 440 may be used interchangeably with retention ring !110 to customize stand 100 in order to retain objects of different sizes or shapes, and may be used to customize the appearance stand while retaining the same utility for elevating an object above the ground via stand 100. Elements 410, 420, 430, and 440 may be attached and detached from vertical support 120 in the same manner as retention ring 110.

Element 410 may include a dish, saucer, or bowl with a downwards extending coupler. The downwards extending coupler may be used to attach or screw element 410 onto vertical support 120. Element 410 may be used to retain any object resting atop the provided surface.

Element 420 may include extension with the downwards extending coupler at one end, that attaches to vertical support 120, and an upwards extending coupler at an opposite end. In some embodiments, the extension may extend laterally or sideways from downwards extending coupler. In some embodiments, the extension may extend diagonally with an upward or downward angle from downward extending coupler. The extension may be made of metal or another rigid material. Various objects may be screwed or inserted into the upwards extending coupler. For instance, element 420 may be used as flag holder.

Element 430 may include curved extension with the downwards extending coupler, that attached to vertical support 120, and curved hook. Various objects may be suspended from the curved hook. For instance, a ring atop a lantern, candle holder, or other object may be inserted through the curved hook and suspended by element 430.

Element 440 may provide a spiral length of tube that may serve as another hook for suspending objects over stand 100. Accordingly, any number of different interchangeable top elements may be used to customize the function and utility of stand 100.

Vertical support 120 may be interchanged to alter the length or height of stand 100. For instance, stand 100 may be configured with a first vertical support that is 2 feet in length for retaining an object closer to the ground, and may be configured with a different second vertical support that is 5 feet in length for greater elevation of the object from the ground. In some embodiments, different vertical supports 120 may have different lengths, thicknesses, and/or shapes (e.g., cylindrical, rectangular-shaped, etc.).

Base 130 of stand 100 may also be interchanged and customized. In particular, modified bases with different support elements may be attached to vertical support 120 to customize the stability of stand 100 and allow stand 100 to retain objects of different weights at different positions and in different types of soil.

Figure 5A:
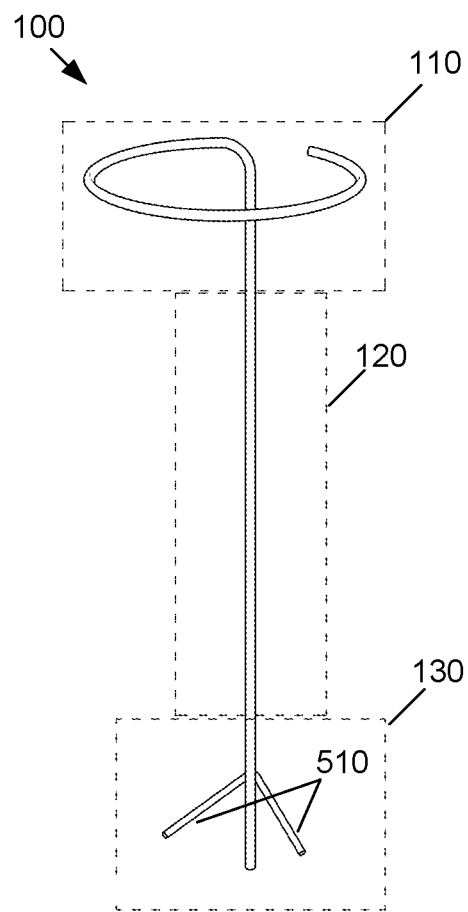
FIGS. 5A and 5B illustrate an example of the stand with modified support elements in accordance with some embodiments presented herein.
Figure 5B:
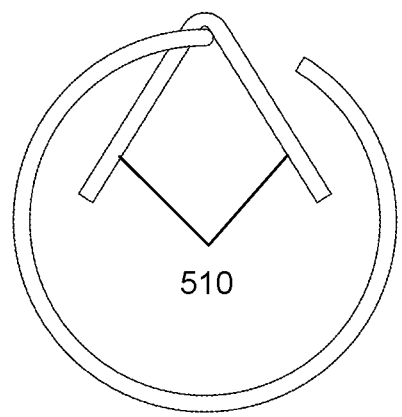

FIGS. 5A and 5B illustrate an example of stand 100 with modified support elements 510 in accordance with some embodiments presented herein. Modified support elements 510 may include a set of prongs or tubular extensions.

The set of prongs may be angled and may extend away from base 130 to retain a vertical position and prevent displacement of stand 100 when stand 100 is inserted in the group and is top-heavy or unevenly weighted as result of an object being supported by retention ring 110 towards a front side of stand 100. In some embodiments, the set of prongs extend horizontally or at an angle away from base 130.

Figure 6:
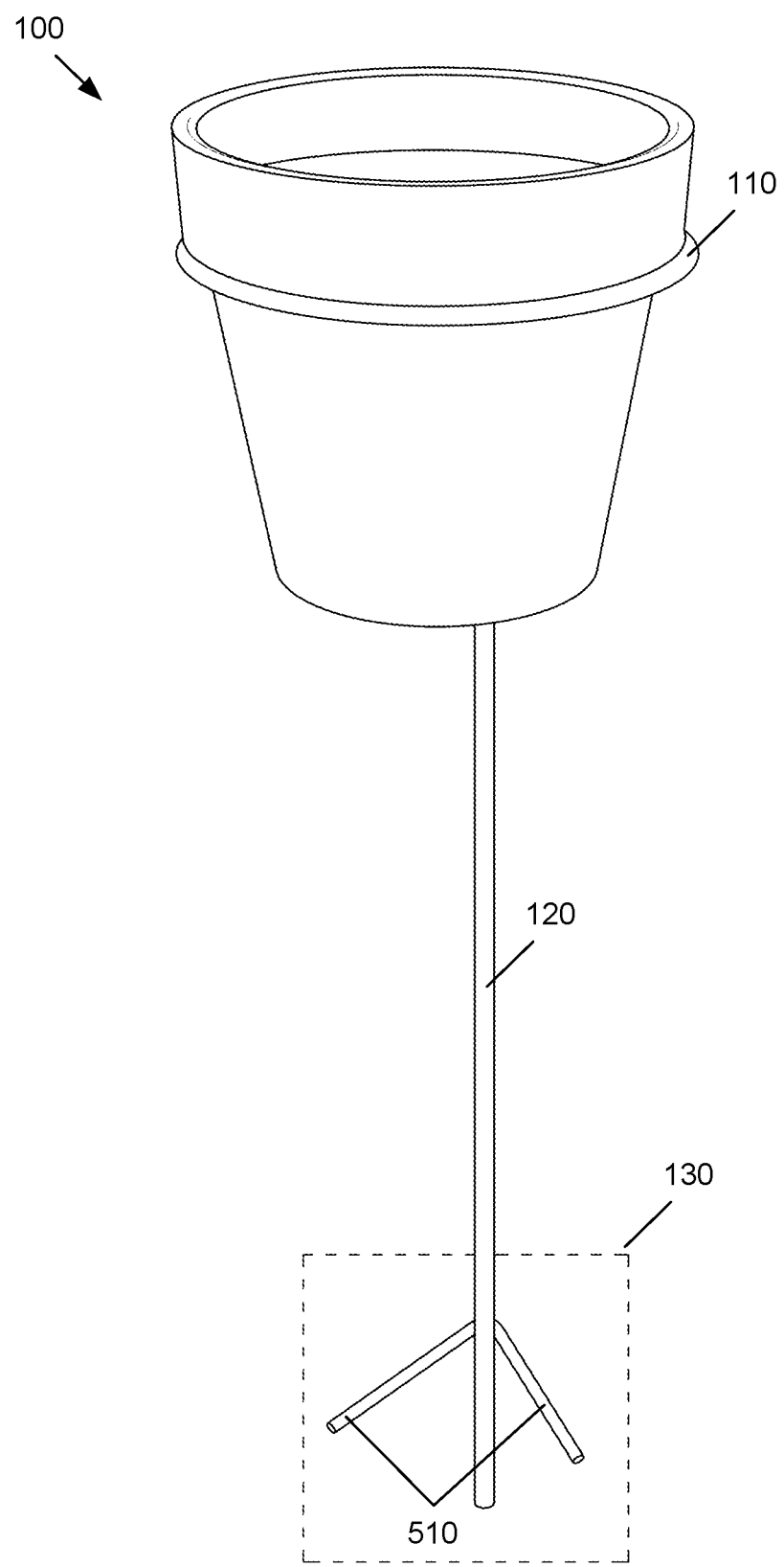
FIG. 6 illustrates an example of the stand with modified support elements holding a pot with the retention ring.

Modified support elements 510 may provide better stability, relative to triangular wedges or support elements 300, in loose soil or sand or in compacted soil. For instance, the set of prongs of modified support elements 510 may extend a greater distance from base 130 than plates of support elements 300, and may prevent leaning or tilting of stand 100 by extending a greater distance through loose soil. FIG. 6 illustrates an example of stand 100 with modified support elements 510 holding a pot with retention ring 110.

Figure 7:
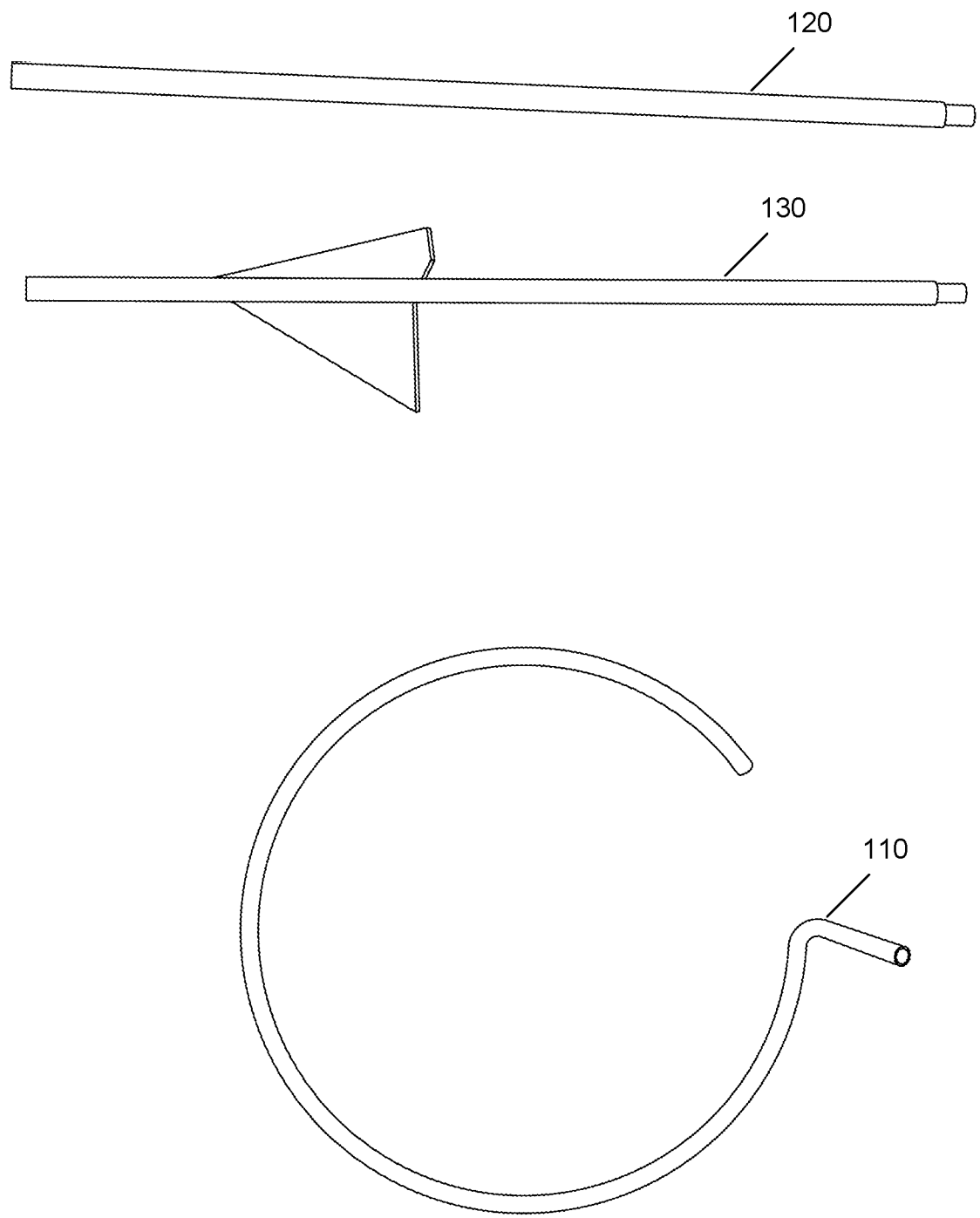
FIG. 7 provides a fully disassembled or detached view of the stand in accordance with some embodiments presented herein.

FIG. 7 provides a fully disassembled or detached view of stand 100 in accordance with some embodiments presented herein. To assemble stand 100, a user may insert the downward protrusion of retention ring 110 into or over a top end of vertical support 120, and may insert the top end of base 130 into or over a bottom end of vertical support 120.

In some embodiments, stand 100 may be further customized with different attachments. In some such embodiments, stand 100 may include a configurable magnetic adapter with different interchangeable faceplates.

Figure 8:
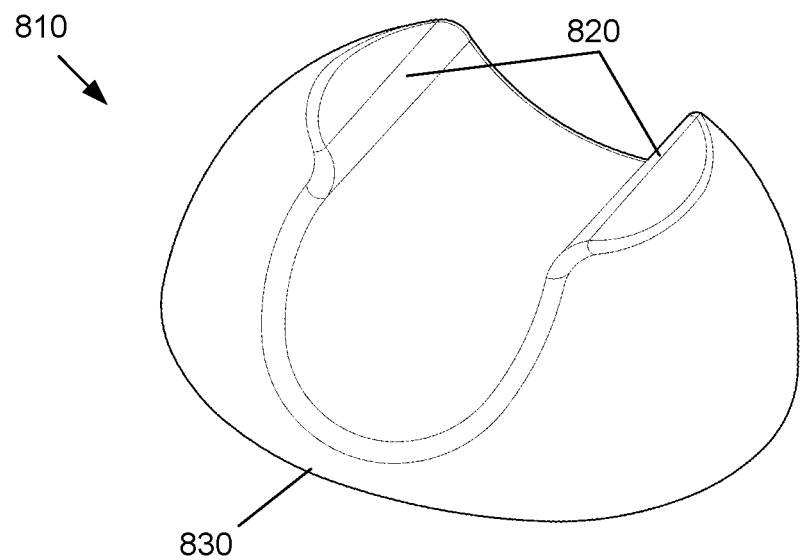
FIG. 8 illustrates a perspective view of a configurable magnetic adapter for the stand in accordance with some embodiments presented herein.

FIG. 8 illustrates a perspective view of configurable magnetic adapter 810 for stand 100 in accordance with some embodiments presented herein. Configurable magnetic adapter 810 may clip-on or attach to vertical support 120 via elastic clip 820 on one side, and may include one or more magnets 830 about a magnetized opposite side for magnetically attaching different faceplates to configurable magnetic adapter 810 and/or stand 100.

Elastic clip 820 may include a rubberized or plastic C-shaped face that flexes to receive and clamp onto vertical support 120. Elastic clip 820 may exert a force (e.g., a spring force) on vertical support 120 that prevents displacement of elastic clip 820 about vertical support 120.

Different faceplates may be magnetically attached to one or more magnets 830 about the opposite side of configurable magnetic adapter 810. One or more magnets 830 may be embedded within the base of adapter 810 under a layer or rubber or plastic or may be exposed.

Figure 9:
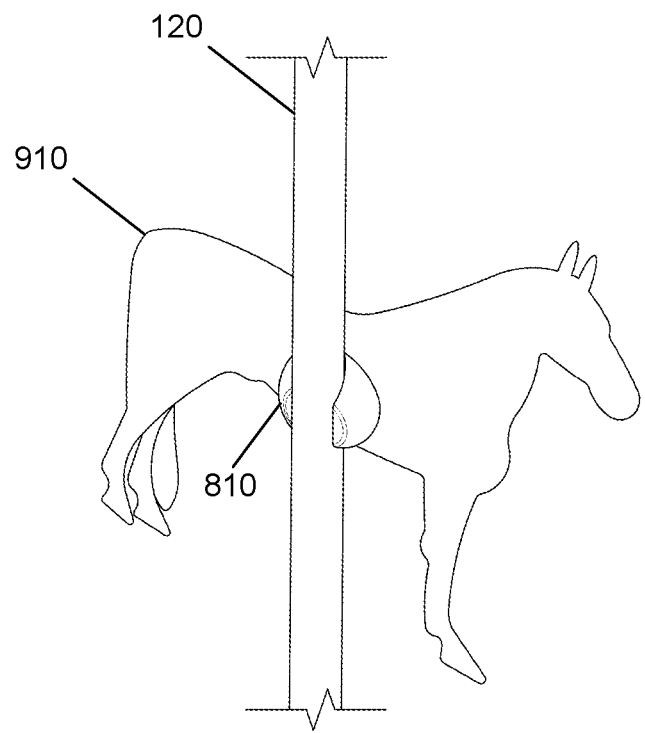
FIG. 9 illustrates an example of the configurable magnetic adapter being attached to a vertical support, and a particular faceplate being magnetically attached to configurable magnetic adapter in accordance with some embodiments presented herein.

The faceplates may be made of metal that is attracted to and magnetically attaches to one or more magnets 830. FIG. 9 illustrates an example of configurable magnetic adapter 810 being attached to vertical support 120, and particular faceplate 910 being magnetically attached to one or more magnets 830 in accordance with some embodiments presented herein. The faceplates may include magnetically attachable hooks, rings, and/or other structures that can be used to suspend additional objects on stand 100, and are not limited to ornamental or decorative pieces. For instance, stand 100 may be customized to replace retention ring 110 with top element 430 that is used to retain a birdhouse, and stand 100 may be further customized with configurable magnetic adapter 810 to include a hook that retains a birdfeeder below the birdhouse.

The foregoing description of implementations provides illustration and description, but is not intended to be exhaustive or to limit the possible implementations to the precise form disclosed. Modifications and variations are possible in light of the above disclosure or may be acquired from practice of the implementations.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A stand comprising:
   an elongated tube comprising a top end and a bottom end;
   an interchangeable retention ring comprising a downward extension that attaches to the top end of the elongated tube, and a length of tube extending laterally in front of the elongated tube as an incomplete ring from the downward extension; and
   an interchangeable base comprising a rod that attaches to the bottom end of the elongated tube, and two support members that extend outwards from each side of the rod, each of the two support members comprising (i) a vertical triangular plate that extends perpendicularly by a particular width from the rod and that narrows to a particular point towards a bottom of the rod, and (ii) a lip that extends perpendicularly over each vertical triangular plate at a top of each vertical triangular plate.

2. The stand of claim 1, wherein each of the top end and the bottom end of the elongated tube, the downward extension of the interchangeable retention ring, and the rod of the interchangeable base comprises one of inner screw threading or outer screw threading.

3. The stand of claim 1, wherein the top end and the bottom end of the elongated tube has a different diameter than the downward extension of the interchangeable retention ring and the rod of the interchangeable base, wherein the top end of the elongated tube inserts into or over the downward extension, and wherein the bottom end of the elongated tube inserts into or over the rod.

4. The stand of claim 1, wherein the interchangeable retention ring further comprises a rotatable coupling joint between the downward extension and the length of tube, wherein the rotatable coupling joint rotates the downward extension to become parallel or perpendicular to the length of tube.

5. The stand of claim 1, wherein the interchangeable retention ring further comprises a coupling joint providing a 90-degree elbow between the downward extension and the length of tube.

6. The stand of claim 1, wherein each support member extends at an angle in front of the elongated tube.

7. The stand of claim 1, wherein the support members extend at a 180-degree angle from the rod and parallel to each other.

8. The stand of claim 1 further comprising a set of interchangeable top elements that provide replacements for the interchangeable retention ring, wherein the set of interchangeable top elements comprises a dish with a downwards extending coupler located centrally under the dish.

9. The stand of claim 8, wherein the set of interchangeable top elements further comprises a spiral tube ending with a hook for suspending objects over the stand.

10. The stand of claim 8, wherein the set of interchangeable top elements further comprises a curved tube ending with a hook for suspending objects over the stand.

11. The stand of claim 1 further comprising a different interchangeable base comprising the rod and set of prongs extending outwards from different sides of the rod.

12. The stand of claim 1 further comprising a configurable magnetic adapter comprising an elastic clip on one side that attaches to the elongated tube, and one or more magnets about an opposite side.

13. The stand of claim 12, wherein the elastic clip comprises a rubberized or plastic C-shaped face that clamps onto and around the elongated tube.

14. The stand of claim 12 further comprising a plurality of faceplates that interchangeably attach to the opposite side of the configurable magnetic adapter via a magnetic force created by the one or more magnets.

15. The stand of claim 14, wherein each of the plurality of faceplates is made of a metal that is attracted to the one or more magnets.

* * * * *